Jan. 13, 1970 W. W. PHARIS 3,489,857

TRUNK CONNECTION ARRANGEMENT FOR PRIVATE TELEPHONE EXCHANGE

Filed Aug. 19, 1966

INVENTOR.
WILLIAM W. PHARIS

BY

Hoffman Stone

ATTORNEY

United States Patent Office 3,489,857

Patented Jan. 13, 1970

3,489,857

TRUNK CONNECTION ARRANGEMENT FOR PRIVATE TELEPHONE EXCHANGE

William W. Pharis, Rochester, N.Y., assignor to Stromberg-Carlson Corporation, Rochester, N.Y., a corporation of Delaware Filed Aug. 19, 1966, Ser. No. 573,608
Int. Cl. H04m 3/60
U.S. Cl. 179—18 3 Claims

ABSTRACT OF THE DISCLOSURE

An adapter circuit for a restricted service telephone system of the kind in which one or more trunks are connected directly to unrestricted, key-set telephones, and the restricted telephones are connected only to a switchboard. The circuit includes a relay tree and a timer enabling a user at an unrestricted station in the system to extend a trunk connection to a restricted station. One adapter circuit is required for each trunk leading into the system, and a tie line connects each trunk to the switchboard.

BRIEF SUMMARY

This invention relates to a novel adapter circuit for a private telephone system of the type wherein only selected stations in the system are connected to outgoing trunks, and the rest of the system stations are ordinarily restricted to calling other stations in the system. In systems of this type, the outgoing trunks are not connected to the central switchboard, or exchange, but are led directly to the selected stations, which are provided with push buttons, or keys for selectively establishing signalling connections between the telephone instruments there and the various different trunks.

The present invention provides a circuit arrangement whereby the trunks may be switched, under control of a person at a key telephone station, to any one of the normally restricted telephones in the system. With the system of the invention, control of trunk calls, both incoming and outgoing, remains with the key telephone stations, but the convenience of receiving and placing calls is extended to all stations in the system.

Figure 1:
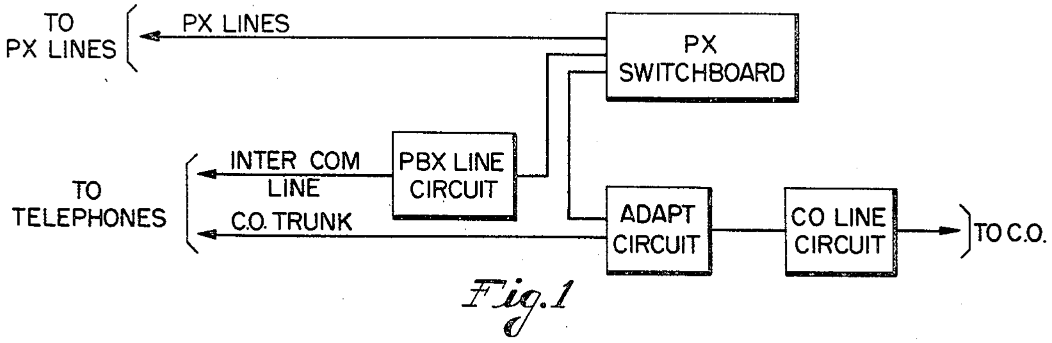
Figure 2:
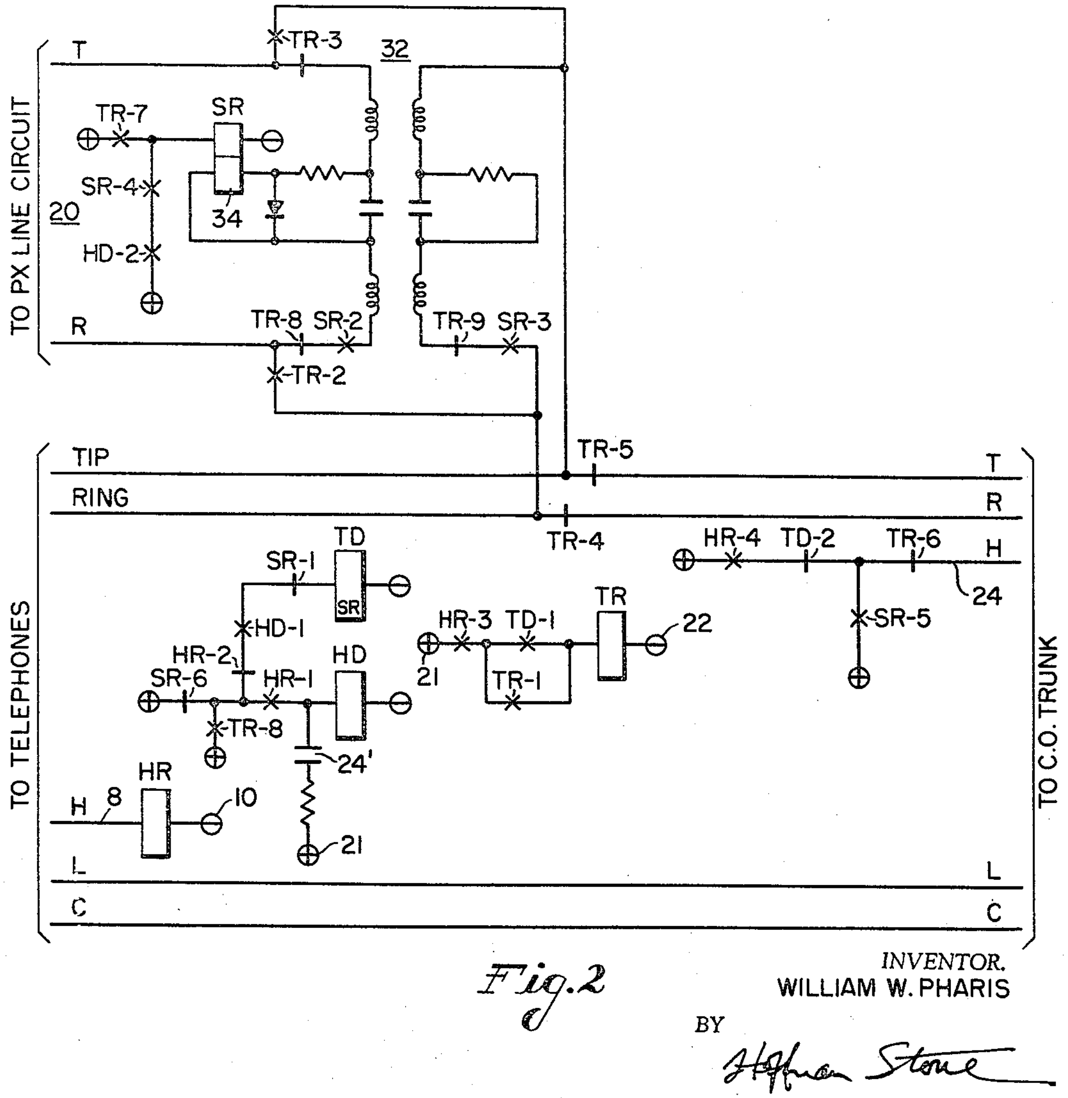

A presently preferred embodiment of the invention will now be described in detail in connection with the accompanying drawing, wherein:

FIGURE 1 is a schematic block diagram illustrating how the adapter circuit of the invention fits into a telephone system of the stated type; and FIGURE 2 is a schematic circuit diagram of an adapter circuit according to the presently preferred embodiment of the invention.

The adapter circuit described herein is intended for use with a standard key telephone system of the type having the following characteristics:

(a) Each trunk line includes a TIP lead, a RING lead, and a HOLD lead.

(b) The HOLD lead is normally connected to a battery terminal whenever the key for the trunk is depressed while the instrument is off-hook, and (c) Operation of the HOLD key disconnects the HOLD lead from the battery terminal.

The circuit may readily be adapted to other types of telephone systems by making appropriate changes, as will be apparent to those skilled in the art.

One adapter circuit of the invention is required in each trunk that is to be made available to the restricted telephones in the system. The adapter is inserted in the trunk at a point electrically on the central office side of all the key telephones.

The operating sequence for a person using the system of the invention is simple and natural. Connections to and from the central office via the trunks are made in the conventional way from the key telephones. To extend such a connection to a normally restricted telephone of the system, the person at the key telephone depresses the HOLD key momentarily to put the trunk on HOLD. He then, within a period of, say, five seconds, reoperates the trunk key. This leaves the trunk on HOLD, and connects the key telephone to the switchboard of the system via a tie line. The person then dials any other station in the system, and may talk with the answering party. The trunk remains on HOLD and split from the connection so that an outside party, one at the other end of the trunk call, does not hear the conversation between the two system stations. Momentary operation of the hookswitch of the key telephone, or disconnect by that station causes the trunk to be connected to the normally restricted station reached from the key station. Subsequent disconnect by the restricted station releases the adapter circuit and no further attention is required.

To put a trunk on HOLD without setting up a connection to a second station of the system, the HOLD key is depressed in the normal manner, and the delay period of five seconds, or so, is allowed to expire before the trunk key is again actuated. Thereafter, re-actuation of the trunk key re-connects the trunk to the key telephone in the normal manner. Since it is very seldom desired to leave a trunk on HOLD for less than five seconds under ordinary circumstances, operation of the adapter circuit of the invention will not interfere with the normal use of the key telephones as heretofore established.

The arrangement of the circuit may perhaps be most easily described and understood by following a typical operating sequence. A first relay HR is connected between a battery terminal 10 and the HOLD lead 8 leading to the key telephone. The relay HR is energized, and normally held energized so long as the key designating the particular trunk is depressed and the key telephone remains off-hook. When, now, a key telephone is connected to the trunk, the relay is energized and held energized until some other key is depressed or the key telephone goes back on hook. With the relay HR energized, its contact HR–1 is closed, and the relay HD in series with the contact HR–1 is also energized. When the HOLD key is then depressed, the relay HR drops, opening its contacts HR–1, HR–3, and HR–4, and closing its contact HR–2. Closing of the contact HR–2 energizes a slow-release relay TD, which controls the timing of the circuit. The trunk key is then again depressed before the slow release relay TD drops. This re-energizes the first relay HR, closing its contact HR–3 to energize a fourth relay TR. The relay TR is connected between a pair of battery terminals 21 and 22 in series with the normally open contact HR–3 of the first relay and the normally open contact TD–1 of the third relay. The contact TD–1 of the third relay is shunted by a self-holding contact TR–1 of the fourth relay, so that the fourth relay TR now remains energized so long as the trunk key remains depressed and the key telephone remains off-hook.

When the fourth relay TR picks up, it connects the TIP and RING leads from the key telephone to the corresponding leads of the tie line 20 to the switchboard through the normally open contacts TR–2 and TR–3. The normally closed contacts TR–4 and TR–5 now open to disconnect the key telephone from the trunk. Yet another normally closed contact TR–6 opens to keep the trunk in its hold condition.

The party at the key telephone can now dial any telephone in the system and talk to the person who answers. The next step is to switch the trunk to the second telephone reached by the person at the key station. This is done simply by placing the key telephone back on-hook, or by momentary actuation of its hookswitch if it is desired to keep the key telephone in the connection. When this happens, the relay HR drops, opening its contact HR–1 and thereby removing the energizing voltage from the relay HD. The relay HD, however, remains held up for a short time pending completion of the present relay cycle because of the capacitor 24 connected between it and the battery terminal 21. The capacitor 24 provides sufficient current to hold the relay HD for the required time after the contact HR–1 opens. A relay SR associated with the bridge transformer 32 at this time is in its energized condition due to closing of the contact TR–7 of the relay TR, and the contact SR–1 is open so the relay TD does not operate at this time, even though the contacts HD–1, HR–2 and TR–8 are all closed. The contact HR–3 opens to de-energize the fourth relay TR. When the relay TR drops while the relay SR remains energized, the TIP and RING leads of the trunk are connected to the bridge transformer 32 through the normally closed contacts TR–3, TR–8 and TR–9, and the normally open contacts SR–2 and SR–3. The relay SR is now held energized by current from the PX switchboard through its secondary winding 34, thereby maintaining the connection. Picking up of the relay SR and dropping out of the relay TR restores the battery voltage to the HOLD lead 24 going to the central office trunk line circuit to remove the trunk from HOLD.

Disconnect by the internal line releases the relay SR and the adapter, unless a key telephone is also connected on the call. In this latter case, the relay HD operates once again, but nothing further happens in the adapter circuit, which now stands ready to switch the trunk to another telephone in the system.

To hold a central office trunk without setting up a connection to an internal line, the HOLD key is depressed in the regular way, but the trunk key is not reoperated immediately. Instead, the person at the key telephone waits, as would be his normal practice, for the delay time required for the relay TD to drop. When the relay TD drops before the relay HR is re-energized, the adapter circuit of the invention becomes disabled because the relay TR cannot then be energized.

The adapter circuit of the invention is thus seen to be of relatively simple construction, and convenient to operate because it conforms to the natural habits and established modes of operation for telephones of the key type.

What is claimed is:

1. A telephone switching circuit for use in a restricted service telephone system of the kind having plural local telephone stations connected to a switchboard, and a trunk connecting selected ones of the local stations to an exchange outside of the system, the selected stations having keys for selectively connecting them to the trunk and for putting the trunk on HOLD, said switching circuit comprising a relay tree connected in the trunk and responsive to actuation of the keys of the selected stations, and a tie line from the trunk to the switchboard, said relay tree including means responsive to actuation of the trunk key at the selected station followed by actuation of the HOLD key and immediate re-actuation of the trunk key, all while the key telephone remains off-hook, for connecting the key telephone through said tie line to the switchboard, and in response to the key telephone station's subsequently going on-hook for connecting the trunk to the switchboard through said tie line.

2. A telephone switching circuit according to claim 1, also including a delayed acting relay for disabling the aforesaid sequence at a predetermined time following actuation of the HOLD key so that subsequent re-actuation of the trunk key simply re-connects the key telephone to the trunk in the conventional way.

3. A telephone switching circuit for use in a restricted service telephone system of the kind having plural local telephone stations connected to a switchboard, and a trunk connecting selected ones of the local stations to an exchange outside of the system, the selected stations having keys for selectively connecting them to the trunk and for putting the trunk on HOLD, said switching circuit comprising a relay tree connected in the trunk and responsive to actuation of the keys of the selected stations, and a tie line from the trunk to the switchboard, said relay tree including means responsive to actuation of the trunk key at the selected station followed by actuation of the HOLD key and immediate re-actuation of the trunk key, all while the key telephone remains off-hook, for connecting the key telephone through said tie line to the switchboard and simultaneously placing the trunk on HOLD and disconnected from said tie line, and in response to the key telephone station's subsequently going on-hook for connecting the trunk to the switchboard through said tie line.

References Cited

UNITED STATES PATENTS

| | | | |
|---|---|---|---|
| 2,486,231 | 10/1949 | Voss | 179—18 |
| 3,385,935 | 5/1968 | Anderson et al. | 179—99 |
| 2,916,555 | 12/1959 | Gatzert | 179—18 |
| 2,071,075 | 2/1937 | Koechling | 179—18 |

KATHLEEN H. CLAFFY, Primary Examiner

W. A. HELVESTINE, Assistant Examiner